United States Patent
Sun et al.

(10) Patent No.: US 10,187,497 B1
(45) Date of Patent: Jan. 22, 2019

(54) SYSTEMS AND METHODS FOR PERFORMING DATA FRAME CONFIGURATION ON THE PHYSICAL LAYER FOR HIGH-DATA RATE WIRELESS LOCAL AREA NETWORKS (WLANS)

(71) Applicant: Marvell International Ltd., Hamilton (BM)

(72) Inventors: Yakun Sun, San Jose, CA (US); Hongyuan Zhang, Fremont, CA (US); Lei Wang, San Diego, CA (US); Liwen Chu, San Ramon, CA (US); Jinjing Jiang, San Jose, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 75 days.

(21) Appl. No.: 15/379,027

(22) Filed: Dec. 14, 2016

Related U.S. Application Data (60) Provisional application No. 62/297,233, filed on Feb. 19, 2016, provisional application No. 62/267,598, filed on Dec. 15, 2015.

(51) Int. Cl.
*H04L 29/06* (2006.01)
*H04L 29/08* (2006.01)
*H04W 84/12* (2009.01)

(52) U.S. Cl.
CPC ............ *H04L 69/22* (2013.01); *H04L 69/323* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2016/0323861 | A1* | 11/2016 | Cordeiro | H04B 7/0452 |
| 2016/0330738 | A1* | 11/2016 | Eitan | H04W 72/0446 |
| 2017/0078008 | A1* | 3/2017 | Kasher | H04B 7/0617 |
| 2017/0134126 | A1* | 5/2017 | Sanderovich | H04L 5/0044 |
| 2017/0134928 | A1* | 5/2017 | Eitan | H04W 8/02 |
| 2017/0201992 | A1* | 7/2017 | Cordeiro | H04W 40/244 |
| 2017/0324599 | A1* | 11/2017 | Lomayev | H04L 27/2613 |

* cited by examiner

*Primary Examiner* — Steve R Young (57) ABSTRACT

Embodiments described herein provide a method for providing a physical-layer control mechanism in accordance with a wireless local area network communication protocol allowing a high data rate. At a wireless receiver, a physical-layer data frame may be received compliant with the wireless local area network communication protocol. When the physical-layer data frame includes only one data unit, a length of an enhanced directional multi-gigabit header from a header associated with the physical-layer data frame may be obtained, and the enhanced directional multi-gigabit header from the physical-layer data frame may be enhanced based on the length. When the physical-layer data frame includes more than one data unit, a first length of a first data unit may be obtained from a first header associated with the first data unit, and the first data unit may be identified from the data frame based on the first length.

20 Claims, 7 Drawing Sheets

```
Receive, at a Wireless Transceiver, a
Physical-Layer Data Frame Compliant with
a Wireless Local Area Network
Communication Protocol  1102
```
↓
```
Obtain a Length of an EDMG Header from
the Header Associated with the Physical-
Layer Data Frame and Identify the EDMG
Header from the Physical-Layer Data Frame
based on the Length, When the Physical-
Layer Data Frame Includes Only One Data
Unit  1104
```
↓
```
Obtain a First Length of a First Data Unit
from the First Header Associated with the
First Data Unit and Identify the First Data
Unit from the Data Frame based on the First
Length, When the Physical-Layer Data
Frame Includes More than One Data Unit
1106
```
↓
```
Send the Physical-Layer Data Frame for
Decoding based on Signaling Information
from the EDMG Header or the Identified
First Data Unit  1108
```

FIG. 11

SYSTEMS AND METHODS FOR PERFORMING DATA FRAME CONFIGURATION ON THE PHYSICAL LAYER FOR HIGH-DATA RATE WIRELESS LOCAL AREA NETWORKS (WLANS)

CROSS-REFERENCE TO RELATED APPLICATIONS

This disclosure claims the benefit of U.S. Provisional Patent Application No. 62/267,598, filed Dec. 15, 2015, and U.S. Provisional Patent Application No. 62/297,233, filed Feb. 19, 2016.

All the aforementioned applications are hereby incorporated by reference in their entireties.

FIELD OF USE

This disclosure relates to physical layer control in a wireless data transmission system; for example, a wireless local area network (WLAN) implementing the IEEE 802.11 standard, which can be used to provide wireless transfer of data in outdoor deployments, outdoor-to-indoor communications, and device-to-device (P2P) networks.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

Development of WLAN standards such as the Institute for Electrical and Electronics Engineers (IEEE) 802.11a, 802.11b, 802.11g, and 802.11n standards has improved data throughput by allowing transmissions across frequency bandwidth. For example, the IEEE 802.11ad is extended to 802.11ay (second generation) to support a higher data rate. The 802.11ay standard may potentially support channel bonding and single-user (SU) or multi-user (MU) multiple-input multiple-output (MIMO) transmission. A physical-layer (PHY) data frame format for single-carrier (SC) orthogonal frequency-division multiplexing (OFDM) PHY has been introduced in U.S. patent application Ser. No. 15/236,242, filed on Aug. 12, 2016, which is herein incorporated by reference in its entirety. The existing control mechanism for PHY in legacy standards, such as the 802.11ad etc., can no longer support the transmission of the new PHY data frame format under 802.11ay. A new control mechanism for PHY in 802.11ay is thus needed to comply with the second generation WLAN standard under a higher data rate.

SUMMARY

Embodiments described herein provide a method for providing a physical-layer control mechanism in accordance with a wireless local area network communication protocol allowing a high data rate. At a wireless receiver and from a wireless channel, a physical-layer data frame may be received compliant with the wireless local area network communication protocol. When the physical-layer data frame includes only one data unit, a length of an enhanced directional multi-gigabit header from a header associated with the physical-layer data frame may be obtained, and the enhanced directional multi-gigabit header from the physical-layer data frame may be enhanced based on the length. When the physical-layer data frame includes more than one data unit, a first length of a first data unit may be obtained from a first header associated with the first data unit, and the first data unit may be identified from the data frame based on the first length. The physical-layer data frame may be sent for decoding based on signaling information from the enhanced directional multi-gigabit header or the identified first data unit.

In some implementations, the wireless local area network communication protocol includes IEEE 802.11ay standard.

In some implementations, the physical-layer data frame includes a legacy short training field, a legacy channel estimation field, and a legacy header, and the physical data frame is decodable by a legacy device that is compliant with IEEE 802.11ad standard.

In some implementations, the enhanced directional multi-gigabit header is received immediately following a data subfield in the physical-layer data frame when the physical-layer data frame includes only one data unit.

In some implementations, the physical-layer data frame further includes a training field received following a data subfield and before the enhanced directional multi-gigabit header, or received after the enhanced directional multi-gigabit header when the physical-layer data frame includes only one data unit.

In some implementations, the header associated with the physical-layer data frame includes an enhanced directional multi-gigabit subfield indicating whether the physical-layer data frame is compliant with a legacy communication protocol or an enhanced communication protocol.

In some implementations, the enhanced directional multi-gigabit header starts with a signature sequence.

In some implementations, a second data unit may be received immediately after the first data unit in the physical-layer data frame when the physical-layer data frame includes more than one data unit.

In some implementations, the second data unit starts with a second header indicating a second length of the second data unit.

In some implementations, the second data unit starts with the enhanced directional multi-gigabit header.

Some embodiments described herein provide a system for providing a physical-layer control mechanism in accordance with a wireless local area network communication protocol allowing a high data rate. The system includes a wireless receiver and control circuitry. The wireless receiver is configured to receive, from a wireless channel, a physical-layer data frame compliant with the wireless local area network communication protocol. The control circuitry is configured to when the physical-layer data frame includes only one data unit, obtain a length of an enhanced directional multi-gigabit header from a header associated with the physical-layer data frame, and identify the enhanced directional multi-gigabit header from the physical-layer data frame based on the length. When the physical-layer data frame includes more than one data unit, the control circuitry is configured to obtain a first length of a first data unit from a first header associated with the first data unit, and identify the first data unit from the data frame based on the first length. The control circuitry is further configured to send the physical-layer data frame for decoding based on signaling information from the enhanced directional multi-gigabit header or the identified first data unit.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for a PHY control mechanism within an 802.11 wireless network at a higher data rate, e.g., compliant with the 802.11ay standard. In some embodiments, a control mechanism on the PHY is implemented through configuration of the header of the data frame that is extended with an enhanced directional multi-gigabit (EDMG) header (E-SIG) field. Various types of configurations of a control PHY EDMG PPDU are discussed in FIGS. 3-7. The data packet transmitted with the control PHY may also be decodable by a legacy device (e.g., a device compliant with 802.11ad) as the control PHY often carries control frames. Control PHY may also support channel aggregation when multiple channels are used for transmission.

Figure 1:
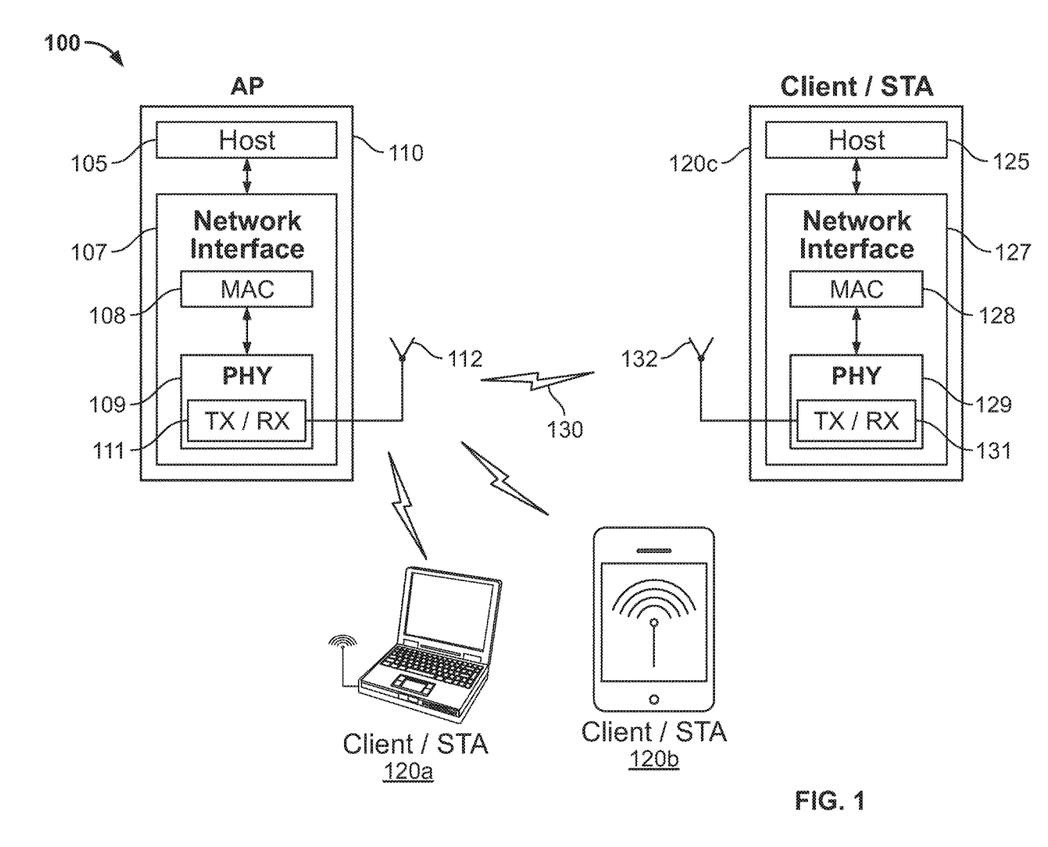
FIG. 1 is a block diagram of an example wireless WLAN 100 that the PHY control mechanism can be operated within, according to some embodiments described herein.

FIG. 1 is a block diagram of an example wireless WLAN 100 that the PHY control mechanism can be operated within, according to some embodiments described herein. A wireless AP 110 (access point) includes a host processor 105 (host control circuitry) that may be configured to process or assist in data operation, such as modulation/demodulation, encoding/decoding, encryption/decryption, and/or the like. For example, the host processor 105 may be configured to configure and/or process the control PHY frames illustrated in FIGS. 3-8, and/or perform the work flows illustrated in FIGS. 9-10.

A network interface device 107 is coupled to the host processor 105, which is configured to interface with an outer network. The network interface device 107 includes a medium access control (MAC) processing unit 108 and a physical layer (PHY) processing unit 109. The PHY processing unit 109 includes a plurality of transceivers 111, and the transceivers 111 are coupled to a plurality of antennas 112.

The WLAN 100 includes a plurality of client stations 120a-c. Although three client stations 120a-c are illustrated in FIG. 1, the WLAN 100 can include different numbers (e.g., 1, 2, 3, 5, 6, etc.) of client stations 120a-c in various scenarios and embodiments. Each client station, e.g., 120a-c, may have a similar structure as that of an AP 110 (access point). For example, the client station 120c can include a host processor 125 (host control circuitry) coupled to a network interface device 127. The network interface device 127 includes a MAC processing unit 128 and a PHY processing unit 129. The PHY processing unit 129 includes a plurality of transceivers 131, and the transceivers 131 are coupled to a plurality of antennas 132 to receive or transmit data from or to the wireless communication channel.

Two or more of the client stations 120a-c may be configured to receive data such as an 802.11 data frame 130, which may be transmitted simultaneously by the AP 110 (access point). Additionally, two or more of the client stations 120a-c can be configured to transmit data to the AP 110 (access point) such that the AP 110 receives the data.

Figure 2:
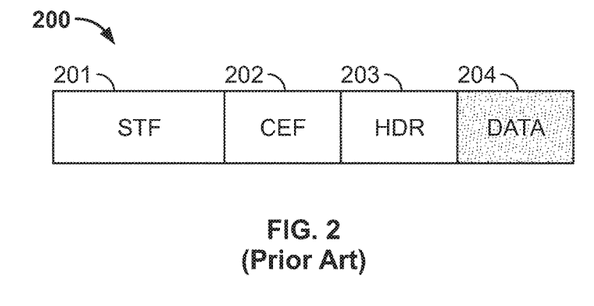
FIG. 2 shows an example block diagram illustrating an example PHY frame format compliant with the IEEE 802.11ad standard.

FIG. 2 shows an example block diagram illustrating an example PHY frame format compliant with the IEEE 802.11ad standard. The data frame 200 includes a short training field (STF 201) that is used for acquisition (e.g., carrier sensing, timing, automatic gain control (AGC) setting, carrier frequency offset (CFO) acquisition and tracking, frame timing, etc.). The channel estimation field (CEF 202) is used for channel estimation, signal identification (single carrier vs. OFDM), and CFO fine tune. The header (HDR 203) block carries the signaling and is jointly encoded with the first portion of data 204. The rest of the payload data 204 is encoded separately.

Figure 3:
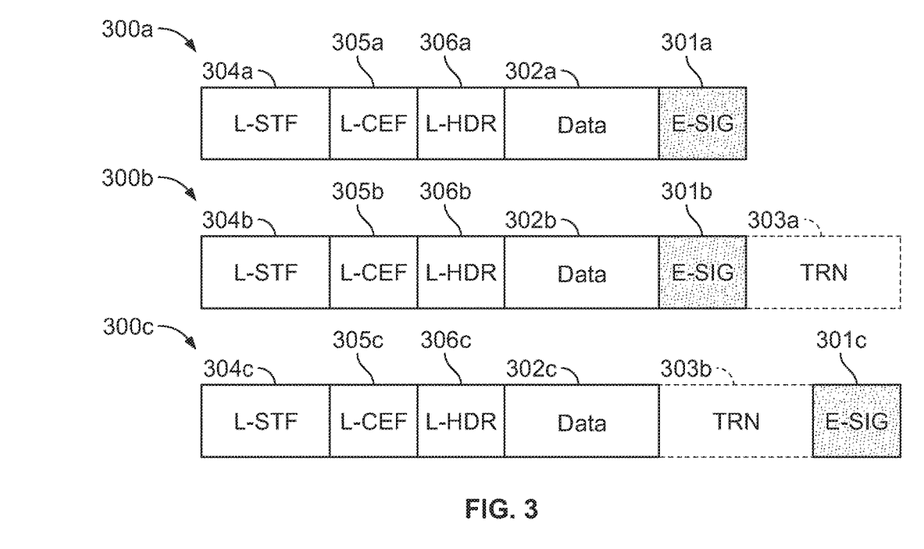
FIG. 3 shows example block diagrams illustrating aspects of an enhanced directional multi-gigabit (EDMG) control PHY Physical Layer Convergence Protocol (PLCP) Protocol Data Unit (PPDU), according to some embodiments described herein.

FIG. 3 shows example block diagrams illustrating aspects of an enhanced directional multi-gigabit (EDMG) control PHY PPDU, according to some embodiments described herein. The EDMG Control PHY PPDU may be configured with a legacy short training field (L-STF 304a-c), legacy channel estimation field 305a-c, and a legacy header (L-HDR 306a-c), and a data field 302a-c, which is similar to the structure of the data frame 200 under 802.11ad as illustrated in FIG. 2. When the data rate is high, e.g., under 802.11ay, an EDMG Control PHY PPDU may be extended to include more information for signaling. For example, the EDMG header may be used in a regular (SC/OFDM) PHY PPDU, after the legacy header (L-HDR 306a-c) and before a data subfield 302a-c. The EDMG signaling field can also be used in a control PHY PPDU. But as the L-HDR is jointly coded with the first portion of data, the EDMG signaling field cannot be placed immediately after L-HDR (and before data portion) as an E-HDR in regular PHY PPDU.

In one implementation, the EDMG Control PHY PPDU may be configured with no E-HDR, and the EDMG CPHY frame is the same as directional multi-gigabit (DMG) CPHY frame (and duplicated on each channel), e.g., used for a legacy device under 802.11ad, etc. For example, the DMG SIG field is configured in the EDMG control PHY frame, and two reserved bits can be redefined for extra signaling for the EDMG frame. For instance, the two reserved bits can be used to indicate the bandwidth, e.g., "00"=1 channel (DMG), and "01"-"11"=2-4 channels with more bandwidth. For another instance, one of the two reserved bits can be used to indicate whether the PPDU is EDMG or DMG, and the other reserved bit can remain unused.

In another implementation, as shown in FIG. 3, the EDMG Control PHY PPDU 300a-c may be configured with an EDMG signaling field (E-SIG 301a-c) after a data subfield 302a-c. A training (TRN 303a-b) subfield may or may not be allowed for EDMG CPHY, e.g., PPDU 300a does not have a TRN subfield, and PPDU 300b-c each has a TRN subfield 303a-b, respectively. Specifically, for PPDU 300a, no TRN-R or TRN-T is allowed for the EDMG CPHY. For PPDU 300b-c, when a TRN subfield 303a-b (both TRN-R and TRN-T) is allowed and transmitted, the E-SIG 301b-c may be transmitted before or after the TRN 303a-b. An example length of E-SIG 301a-c may always be multiples of 4992 chips, or an arbitrary number of bits with padding to meet the length indicated by L-HDR 306a-c.

Figure 4:
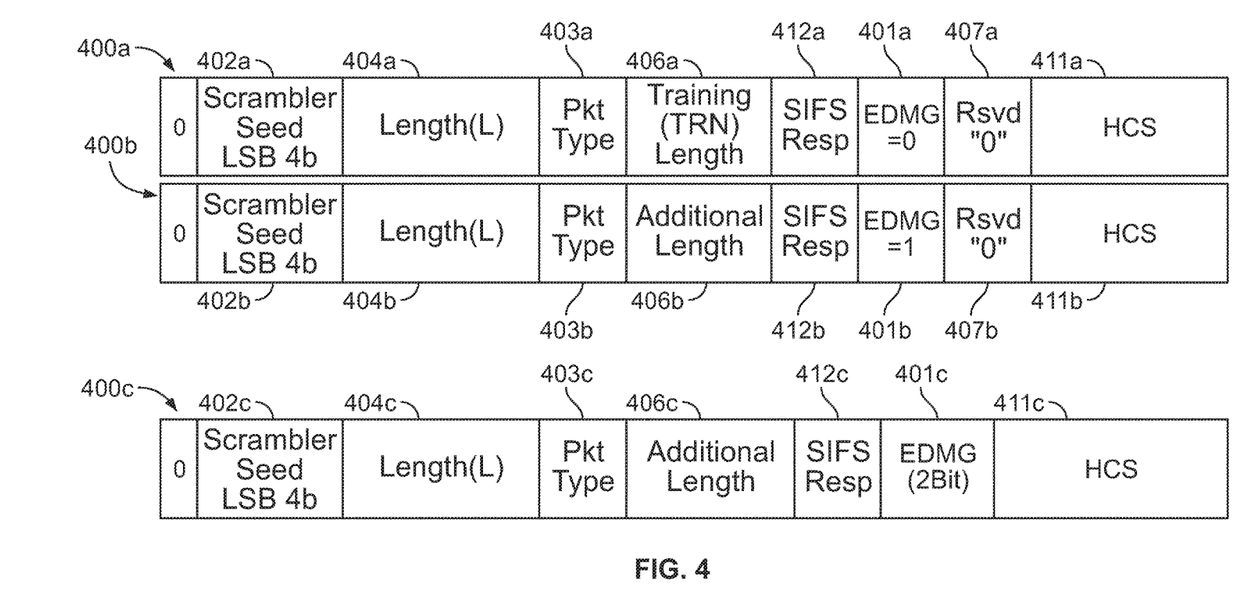
FIG. 4 shows example block diagrams illustrating aspects of example L-HDR configuration (e.g., see L-HDR fields 306a-c) for an EDMG CPHY frame 300a-c as illustrated in FIG. 3, according to some embodiments described herein.

FIG. 4 shows example block diagrams illustrating aspects of example L-HDR configuration (e.g., see L-HDR fields 306a-c) for an EDMG CPHY frame 300a-c as illustrated in FIG. 3, according to some embodiments described herein. Each of the L-HDR fields 400a-c contains a 0 bit to start, a 4-bit scrambler seed for the least significant bits 402a-c, a length subfield 404a-c indicating the length of the corresponding data filed, a packet type subfield 403a-c, a short interface space response subfield (SIFS Resp 412a-c), a header check sequence subfield 411a-c or the like.

In the L-HDR field 400a, the EDMG subfield 401a is 0, which indicates this is a DMG frame; and in the L-HDR field 400b, the EDMG subfield 401b is 1, which indicates the respective frame is an EDMG frame. When the EDMG subfield 401a is 0, a training length subfield 406a is used. When the EDMG subfield 401b is 1, an additional length subfield 406b is used, wherein the additional length=K+N (in unit of TRN subfields), where N is the length of TRN (e.g., 303a-b in FIG. 3), and K is the length of E-SIG (e.g., 301a-c in FIG. 3). Or the additional length equals K as the length of E-SIG (e.g., 301a-c in FIG. 3), and the length of TRN (if present) is signaled in E-SIG. When a legacy device may not accurately know the end of the PPDU, and may rely on carrier sensing for further back-off, the additional length of K may be used.

In some implementations, the order of the EDMG subfield 401a-b and the reserved bit 407a-b may be swapped.

In some implementations, the L-HDR field 400c may have an EDMG subfield 401c of two bits. For example, when EDMG subfield=00, it indicates the respective PPDU is a DMG frame; when the EDMG subfield="01", "10", or "11" it indicates the respective PPDU is an EDMG frame. Here the additional length 406c is equivalent to m×K+N, where N is the length of the TRN field, and K is the basic length of E-SIG, and m is the value of the EDMG subfield. The two-bit EDMG subfield 401c value may not necessarily range from 1-3. For example, the EDMG subfield 401c can just take the values of "01" and "10", and "11" is reserved.

Alternatively, at L-HDR field 400c, the two-bit EDMG subfield 401c may be two reserved RSVD bits. In this case, the additional length 406c equals=K+N, where K is the length of an E-HDR field, and K may or may not be known at a wireless receiver.

Figure 5:
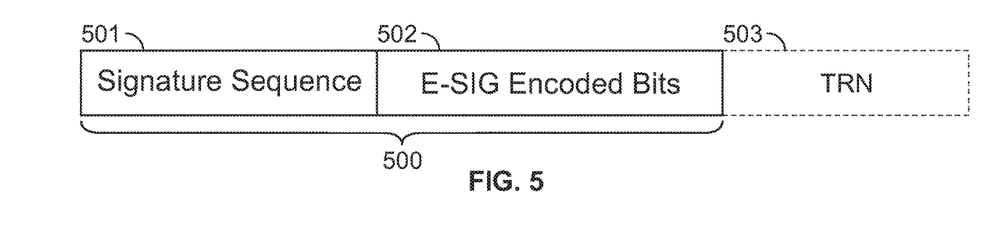
FIG. 5 provides an example block diagram illustrating an example structure of the E-SIG field 301a-c in FIG. 3, according to some embodiments described herein.

FIG. 5 provides an example block diagram illustrating an example structure of the E-SIG field 301a-c in FIG. 3, according to some embodiments described herein. The E-SIG field 500 may start with a signature sequence 501, e.g., an orthogonal sequence to the AGC subfield in TRN 503 (e.g., similar to 303a in FIG. 3). For example, the signature sequence 501 may take a form similar to [Ga64 Ga64 Ga64 Ga64 Ga64], or [Gb64 −Gb64 Gb64 −Gb64]. The signature sequence 501 may be followed by E-SIG encoded bits 502.

Figure 6:
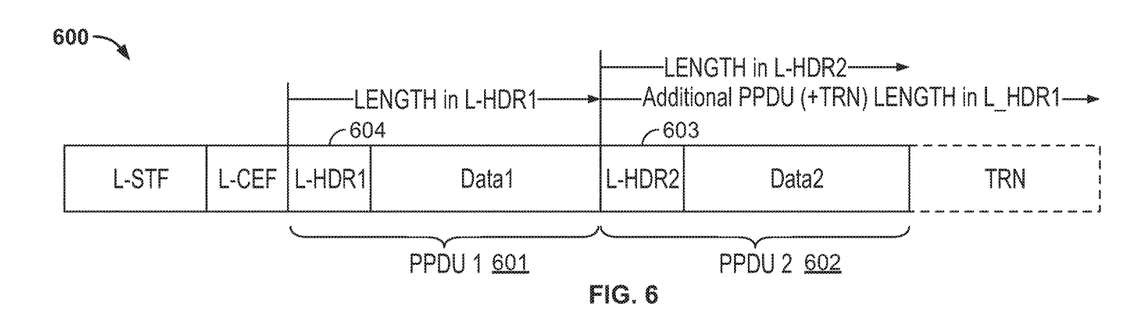
FIG. 6 provides an example block diagram illustrating an example structure of an A-PPDU with L-HDR, according to some embodiments described herein.

FIG. 6 provides an example block diagram illustrating an example structure of an A-PPDU with L-HDR, according to some embodiments described herein. An additional PPDU for Control PHY may be used for an EDMG PPDU 600 (e.g., similar to 300a-c in FIG. 3). For example, signaling and additional payload goes in an additional PPDU 602 immediately after the first PPDU 601 starting with an L-HDR 603 without any additional preamble.

The one or more additional PPDU 602 is transmitted after the first PPDU 601. Each starts with an L-HDR 603, but the additional PPDU 602 does not have additional L-STF or L-CEF. The classification of the additional PPDU for EDMG CPHY frame may be done in a similar way as that in FIG. 5, e.g., a signature sequence can happen immediately before L-HDR2 603 (not shown in FIG. 6). The LENGTH subfield in L-HDR1 604 indicates the length to the first PSDU 601. The length of all the additional PPDUs is indicated using other subfields in L-HDR. The length of the additional PPDU 602 is indicated in the corresponding L-HDR 603. For example, the length of the additional PPDU 602 is the multiples of 4992 chips, or an arbitrary number of bits with padding to reach to the LENGTH indicated in L-HDR1 604.

Figure 7:
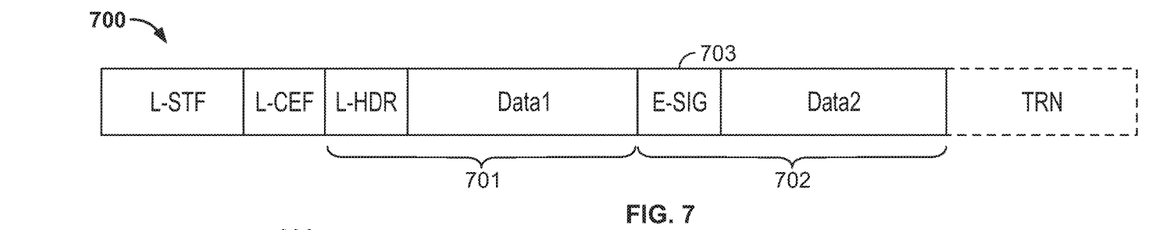
FIG. 7 provides an example block diagram illustrating an example structure of an A-PPDU with E-SIG, according to some embodiments described herein.

FIG. 7 provides an example block diagram illustrating an example structure of an A-PPDU with E-SIG, according to some embodiments described herein. Similar to FIG. 6, when an additional PPDU is used for Control PHY for an EDMG PPDU (e.g., 300a-c in FIG. 3), signaling and additional payload goes in the additional PPDU 702 immediately after the first PPDU 701. The additional PPDU 702 starts with an E-SIG 703 without any additional preamble L-STF or L-CEF. Classification and the length indication can be done in a similar way as introduced in FIG. 6. When the additional PPDU 702 is a null data packet (NDP), this configuration 700 is the same as 300a in FIG. 3.

Figure 8:
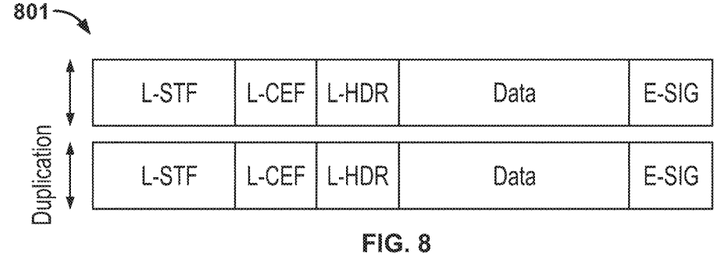
FIG. 8 provides an example block diagram illustrating an example structure of 802.11ay control PHY frame format with channel aggregation, according to some embodiments described herein.

FIG. 8 provides an example block diagram illustrating an example structure of 802.11ay control PHY frame format with channel aggregation, according to some embodiments described herein. The control PHY signals, e.g., the frame 801 (similar to 300a in FIG. 3), may be modulated and duplicated over each channel used. Duplication may include a phase rotation to reduce the peak-to-average power ratio (PAPR).

Figure 9:
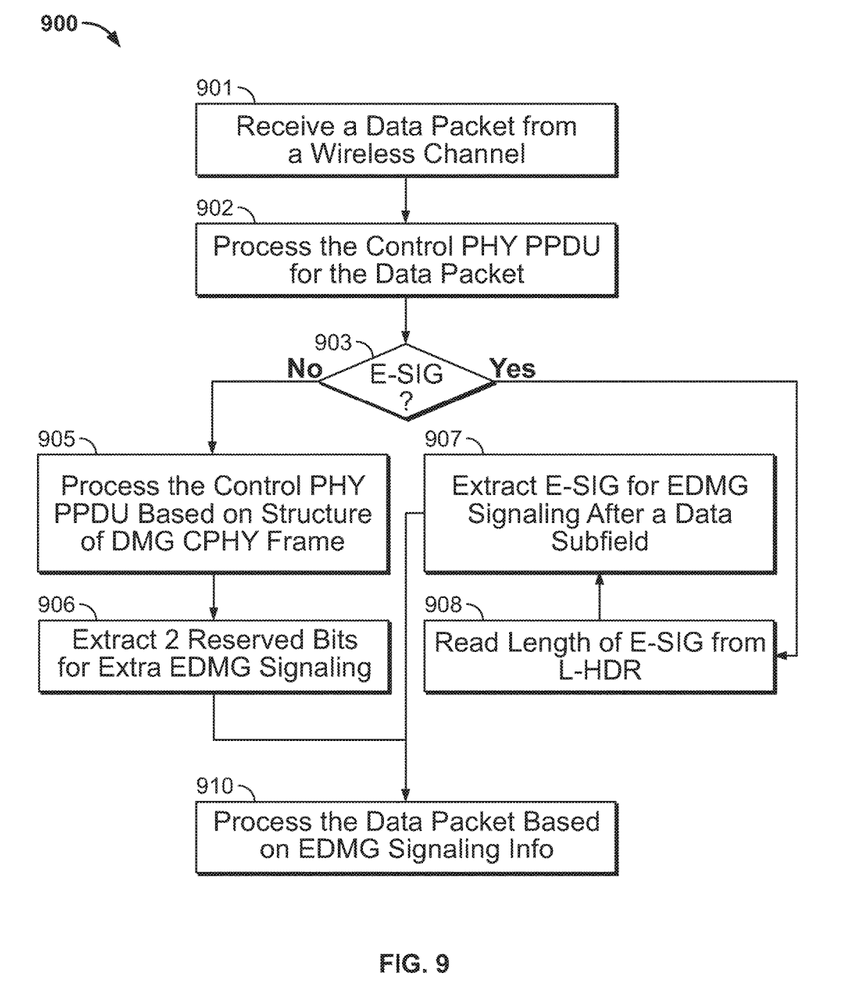
FIG. 9 provides an example logic flow diagram 900 illustrating aspects of processing an EDMG control PHY PPDU (e.g., similar to 300a-c in FIG. 3), according to some embodiments described herein.

FIG. 9 provides an example logic flow diagram 900 illustrating aspects of processing an EDMG control PHY PPDU (e.g., similar to 300a-c in FIG. 3), according to some embodiments described herein. At 901, a data packet may be received, e.g., by a wireless receiver, from a wireless channel. At 902 the wireless receiver may process the received data packet to obtain the control PHY PPDU. At 903, control circuitry, e.g., at the wireless receiver, may determine whether the control PHY PPDU contains an E-SIG field. If not, the control PHY PPDU may be processed based on a similar structure of a DMG control PHY frame at 905. For example, at 906, two reserved bits may be extracted from the control PHY frame for extra EDMG signaling. For instance, the two reserved bits can be used to indicate the bandwidth, e.g., "00"=1 channel (DMG), and "01"-"11"=2-4 channels. For another instance, one of the two reserved bits can be used to indicate whether the PPDU is EDMG or DMG, and the other reserved bit can remain unused.

At 903, if the control PHY PPDU includes an E-SIG field, the wireless receiver may read the length of the E-SIG field from an L-HDR field at 908 (e.g., see the data frames 300a-c in FIG. 3). At 907, the E-SIG may be extracted after a data subfield for EDMB signaling based on the length of the E-SIG field. At 910, the received data packet may be processed based on the EDMG signaling information, e.g., the data packet and the EDMG signaling information identified from 906 or 907 may then be forwarded to a decoder for decoding the payload data.

Figure 10:
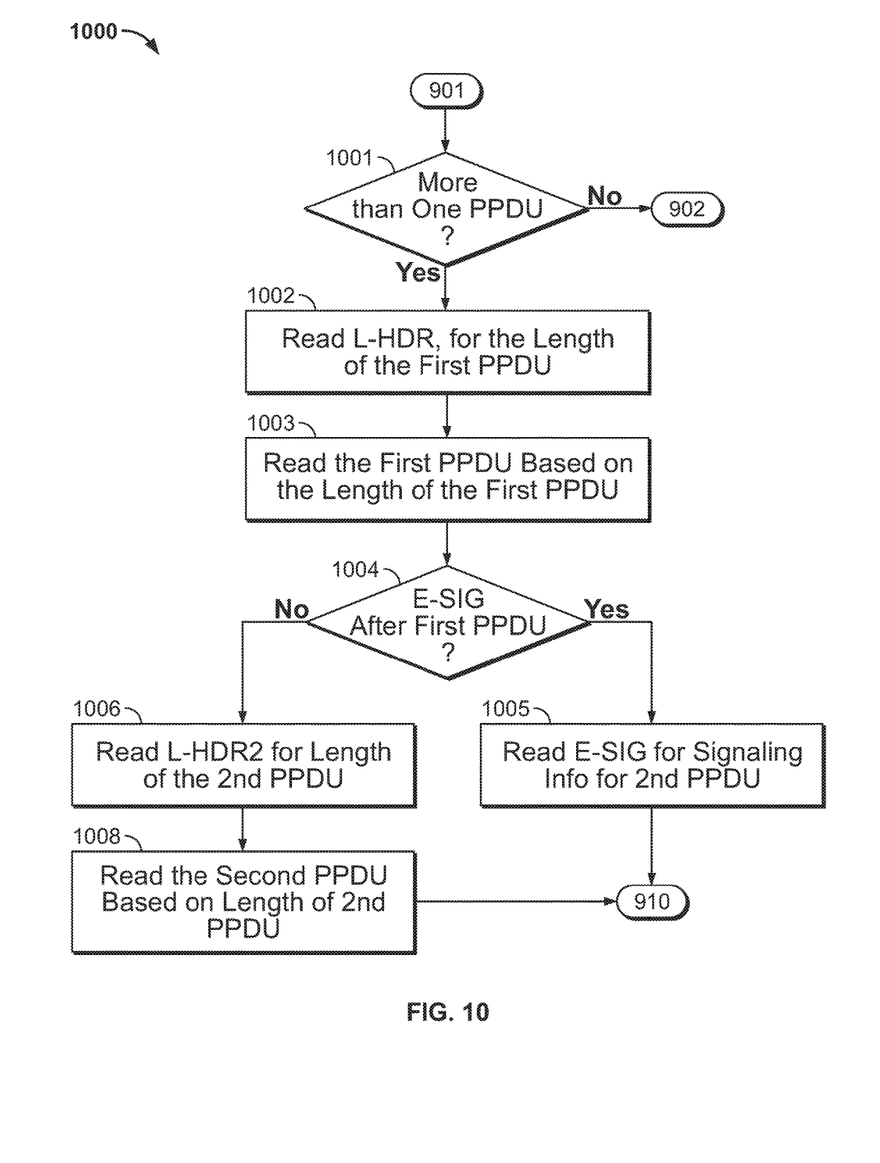
FIG. 10 provides another example logic flow diagram 1000 illustrating aspects of processing an EDMG control PHY PPDU (e.g., similar to 600 in FIGS. 6 and 700 in FIG. 7), according to some embodiments described herein.

FIG. 10 provides another example logic flow diagram 1000 illustrating aspects of processing an EDMG control PHY PPDU (e.g., similar to 600 in FIGS. 6 and 700 in FIG. 7), according to some embodiments described herein. Continuing on from 901 in FIG. 1 where a data packet is received at a wireless receiver, it may be determined whether more than one PPDU is included in the data packet at 1001. If not, the process may continue with 902 in FIG. 9. If more than one PPDU is present, the L-HDR field (e.g., see 604 in FIG. 6) of the first PPDU may be read to obtain a length of the first PPDU at 1002. At 1003, the first PPDU may then be read based on the length of the first PPDU.

At 1004, the control circuitry, e.g., at the wireless receiver, may determine whether an E-SIG field follows the first PPDU. If not, then the L-HDR field following the first PPDU may be read to obtain a length of the second PPDU at 1006. At 1008, the second PPDU may be processed based on the length of the second PPDU. If an E-SIG field is identified after the first PPDU at 1004, the E-SIG field may be processed for signaling information of the second PPDU at 1005.

It is noted that although FIGS. 6-7 and 10 discuss two PPDUs, more than two PPDUs may be used. For example, more than two PPDUs may be included, each with a respective L-HDR or E-SIG, but without repeating the L-STF or L-CEF.

The control PHY data frame and signaling methods discussed in FIGS. 3-10, although the different embodiments are discussed primarily for 802.11ay, can be extended to other 802.11 standards with a higher data rate.

Figure 11:
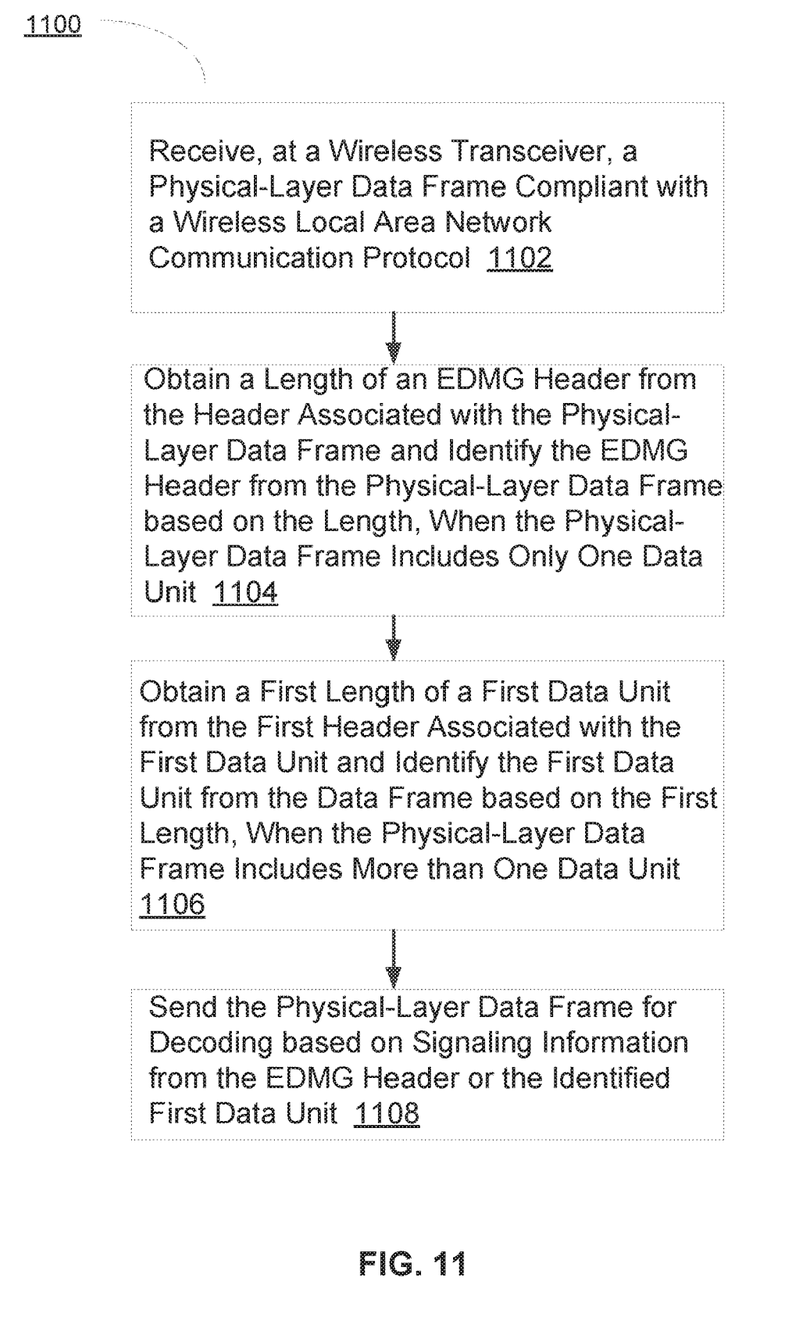
FIG. 11 provides another example logic flow diagram 1100 illustrating aspects of providing a physical-layer control mechanism, according to some embodiments described herein.

FIG. 11 provides another example logic flow diagram 1100 illustrating aspects of providing a physical-layer control mechanism, according to some embodiments described herein. At 1102, a physical-layer data frame compliant with a WLAN communication protocol (e.g., 802.11ay), may be received at a wireless transceiver. At 1104, when the physical-layer data frame includes only one data unit (e.g., a PPDU), the length of an EDMG header may be obtained from the header (e.g., the L-HDR header) associated with the physical-layer data frame. The EDMG header may then be identified from the physical-layer data frame based on the length.

At 1106, when the physical-layer data frame includes more than one data unit (e.g., PPDU), a first length of a first data unit (e.g., a first PPDU) may be obtained from a first header (e.g., a first L-HDR header) associated with the first data unit. The first data unit (e.g., PPDU) may then be identified from the data frame based on the first length. At 1108, the physical-layer data frame may be sent for decoding based on signaling information from the EDMG header or the identified first data unit.

While this specification contains many specifics, these should not be construed as limitations on the scope of what may be claimed, but, rather, as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve the desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

Suitable computer program code residing on a computer-readable medium may be provided for performing one or more functions in relation to performing the processes as described herein. The term "computer-readable medium" as used herein refers to any non-transitory or transitory medium that provides or participates in providing instructions to a processor of the computing device (e.g., the AP 110, the client STAs 120a-c, or any other processor of a device described herein) for execution. Such a medium may take many forms, including but not limited to non-volatile media and volatile media. Nonvolatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method for providing a physical-layer control mechanism in accordance with a wireless local area network communication protocol allowing a high data rate, the method comprising:

receiving, at a wireless receiver from a wireless channel, a physical-layer data frame transmitted under an enhanced directional multi-gigabit (EDMG) protocol;

when the physical-layer data frame includes only one data unit:
 obtaining a length of a legacy header, which is configured as an EDMG header having an EDMG subfield indicating a type of the physical-layer data frame without any additional EDMG header, by reading a length field from the legacy header associated with the physical-layer data frame,
 identifying header information from the physical-layer data frame based on the length, and
 sending the physical-layer frame for decoding as an EDMG data frame based on signaling information from identified header information;

when the physical-layer data frame includes more than one data unit:
 obtaining a first length of a first data unit from a first legacy header, which is configured as a first EDMG header associated with the first data unit without any additional EDMG header, the first legacy header having a first EDMG subfield indicating the type of the physical-layer data frame,
 identifying the first data unit from the data frame based on the first length, and
 sending the physical-layer data frame for decoding the identified first data unit as the EDMG data frame based on signaling information from the first legacy header.

2. The method of claim 1, wherein the wireless local area network communication protocol includes IEEE 802.11ay standard.

3. The method of claim 1, wherein the physical-layer data frame includes a legacy short training field, a legacy channel estimation field, and a legacy header, and the physical data frame is decodable by a legacy device that is compliant with IEEE 802.11ad standard.

4. The method of claim 1, wherein the EDMG header is received immediately following a data subfield in the physical-layer data frame when the physical-layer data frame includes only one data unit.

5. The method of claim 1, wherein the physical-layer data frame further includes a training field received following a data subfield and before the EDMG header, or received after the EDMG header when the physical-layer data frame includes only one data unit.

6. The method of claim 1, wherein the header associated with the physical-layer data frame includes the EDMG subfield indicating whether the physical-layer data frame is compliant with a legacy communication protocol or an enhanced communication protocol.

7. The method of claim 1, wherein the EDMG header starts with a signature sequence.

8. The method of claim 1, further comprising:
 receiving a second data unit immediately after the first data unit in the physical-layer data frame when the physical-layer data frame includes more than one data unit.

9. The method of claim 8, wherein the second data unit starts with a second header indicating a second length of the second data unit.

10. The method of claim 8, wherein the second data unit starts with the EDMG header.

11. A system for providing a physical-layer control mechanism in accordance with a wireless local area network communication protocol allowing a high data rate, the system comprising:
 a wireless receiver configured to receive, from a wireless channel, a physical-layer data frame transmitted under an enhanced directional multi-gigabit (EDMG) protocol; and
 control circuitry configured to:
  when the physical-layer data frame includes only one data unit:
   obtain a length of a legacy header, which is configured as an EDMG header having an EDMG subfield indicating a type of the physical-layer data frame without any additional EDMG header, by reading a length field from the legacy header associated with the physical-layer data frame,
   identify header information from the physical-layer data frame based on the length, and
   send the physical-layer frame for decoding as an EDMG data frame based on signaling information from identified header information;
  when the physical-layer data frame includes more than one data unit:
   obtaining a first length of a first data unit from a first legacy header, which is configured as a first EDMG header associated with the first data unit without any additional EDMG header, the first legacy header having a first EDMG subfield indicating the type of the physical-layer data frame,
   identify the first data unit from the data frame based on the first length, and
   send the physical-layer data frame for decoding the identified first data unit as the EDMG data frame based on signaling information from the first legacy header.

12. The system of claim 11, wherein the wireless local area network communication protocol includes IEEE 802.11ay standard.

13. The system of claim 11, wherein the physical-layer data frame includes a legacy short training field, a legacy channel estimation field, and a legacy header, and the physical data frame is decodable by a legacy device that is compliant with IEEE 802.11ad standard.

14. The system of claim 11, wherein the EDMG header is received immediately following a data subfield in the physical-layer data frame when the physical-layer data frame includes only one data unit.

15. The system of claim 11, wherein the physical-layer data frame further includes a training field received following a data subfield and before the EDMG header, or received after the EDMG header when the physical-layer data frame includes only one data unit.

16. The system of claim 11, wherein the header associated with the physical-layer data frame includes an EDMG subfield indicating whether the physical-layer data frame is compliant with a legacy communication protocol or an enhanced communication protocol.

17. The system of claim 11, wherein the EDMG header starts with a signature sequence.

18. The system of claim 11, wherein the control circuitry is further configured to:
 receiving a second data unit immediately after the first data unit in the physical-layer data frame when the physical-layer data frame includes more than one data units.

19. The system of claim 11, wherein the second data unit starts with a second header indicating a second length of the second data unit.

20. The system of claim 11, wherein the second data unit starts with the EDMG header.

\* \* \* \* \*